United States Patent
You et al.

(10) Patent No.: US 12,438,149 B2
(45) Date of Patent: Oct. 7, 2025

(54) ASSEMBLY, BATTERY CELL, BATTERY, AND ELECTRIC APPARATUS CONTAINING SAME

(71) Applicant: Contemporary Amperex Technology (Hong Kong) Limited, Hong Kong (CN)

(72) Inventors: Xingyan You, Ningde (CN); Yuwen Wang, Ningde (CN); Wenlong Bai, Ningde (CN); Wei Zheng, Ningde (CN); Baozhen Wu, Ningde (CN); Kai Wu, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 19/034,792

(22) Filed: Jan. 23, 2025

(65) Prior Publication Data
US 2025/0226399 A1  Jul. 10, 2025

Related U.S. Application Data

(63) Continuation of application No. PCT/CN2023/070150, filed on Jan. 3, 2023.

(51) Int. Cl.
*H01M 4/38* (2006.01)
*H01M 4/36* (2006.01)
(Continued)

(52) U.S. Cl.
CPC ............ *H01M 4/366* (2013.01); *H01M 4/48* (2013.01); *H01M 4/587* (2013.01);
(Continued)

(58) Field of Classification Search
CPC ........ H01M 4/366; H01M 4/48; H01M 4/587; H01M 10/0587; H01M 50/103;
(Continued)

(56) References Cited

U.S. PATENT DOCUMENTS

2018/0316001 A1* 11/2018 Kim ................. H01M 4/134

FOREIGN PATENT DOCUMENTS

| CN | 1551403 A | 12/2004 |
| CN | 111656583 A | 9/2020 |

(Continued)

OTHER PUBLICATIONS

Machine translation of JP 2015-028943, retrieved from <www.espacenet.com> on Jul. 18, 2025.*

(Continued)

*Primary Examiner* — Cynthia K Walls
(74) *Attorney, Agent, or Firm* — Ladas & Parry LLP

(57) ABSTRACT

A negative electrode plate and an electrode assembly, a battery cell, a battery, and an electric apparatus containing the same are provided. The negative electrode plate (10) includes: a negative electrode current collector, having a first surface (10a) and a second surface (10b) opposite each other in a thickness direction of the negative electrode current collector; a first negative electrode film layer located on the first surface side, the first negative electrode film layer including first silicon-based negative electrode active material particles; and a second negative electrode film layer located on the second surface side, the second negative electrode film layer including second silicon-based negative electrode active material particles; where a capacity $C_1$ per unit area of the first negative electrode film layer and a capacity $C_2$ per unit area of the second negative electrode film layer satisfy: $0.005 \text{ mAh/mm}^2 \leq C_2 < C_1 \leq 0.2 \text{ mAh/mm}^2$.

15 Claims, 3 Drawing Sheets

(51) Int. Cl.
  *H01M 4/48*      (2010.01)
  *H01M 4/587*     (2010.01)
  *H01M 10/0587*   (2010.01)
  *H01M 50/103*    (2021.01)
  *H01M 4/02*      (2006.01)

(52) U.S. Cl.
  CPC ..... *H01M 10/0587* (2013.01); *H01M 50/103* (2021.01); *H01M 2004/021* (2013.01); *H01M 2004/027* (2013.01); *H01M 2220/20* (2013.01)

(58) Field of Classification Search
  CPC ..... H01M 2004/021; H01M 2004/027; H01M 2220/20; H01M 4/13; H01M 4/134; H01M 4/1395; H01M 4/38; H01M 4/62; Y02E 60/10; Y02P 70/50
  See application file for complete search history.

(56) References Cited

FOREIGN PATENT DOCUMENTS

| | | | |
|---|---|---|---|
| CN | 113228341 A | 8/2021 | |
| CN | 113875046 A | 12/2021 | |
| CN | 113875049 A | 12/2021 | |
| CN | 113875051 A | 12/2021 | |
| CN | 111916844 B | 4/2022 | |
| CN | 115148960 A | 10/2022 | |
| JP | 2011023131 A | 2/2011 | |
| JP | 2013073774 A | 4/2013 | |
| JP | 2013120621 A | 6/2013 | |
| JP | 2015-028943 * | 2/2015 | ............ H01M 4/131 |
| JP | 2018055952 A | 4/2018 | |
| WO | 2013062056 A1 | 5/2013 | |
| WO | 2021258275 A1 | 12/2021 | |
| WO | 2022165727 A1 | 8/2022 | |
| WO | 2022205032 A1 | 10/2022 | |

OTHER PUBLICATIONS

International Search Report for International Application PCT/CN2023/070150.
Written Opinion for for International Application PCT/CN2023/070150.
Chinese First Office Action for copending Application No. 202380009791.1 dated Apr. 18, 2024.
Chinese Grant for copending Application No. 202380009791.1 dated Jul. 1, 2024.

* cited by examiner

ASSEMBLY, BATTERY CELL, BATTERY, AND ELECTRIC APPARATUS CONTAINING SAME

CROSS-REFERENCE TO RELATED APPLICATIONS

This application is a continuation of International application PCT/CN2023/070150 filed on Jan. 3, 2023, the subject matter of which is incorporated herein in its entirety.

TECHNICAL FIELD

This application pertains to the technical field of secondary batteries, and specifically relates to a negative electrode plate and an electrode assembly, a battery cell, a battery, and an electric apparatus containing the same.

BACKGROUND

Secondary batteries are charged and discharged through repeated intercalation and deintercalation of active ions between positive and negative electrodes, with outstanding features such as high energy density, long cycle life, no pollution, and no memory effect. Therefore, as clean energy, secondary batteries have been gradually popularized from electronic products to large-scale apparatuses such as electric vehicles to adapt to sustainable development strategies of environment and energy.

With the enhancement of the market position of secondary batteries, there is an expectation for secondary batteries to not only have higher energy density but also have good safety performance and long-term cycling performance.

SUMMARY

This application is intended to provide a negative electrode plate and an electrode assembly, a battery cell, a battery, and an electric apparatus containing the same, to enable secondary batteries to have high energy density, high safety performance, and good long-term cycling performance.

To achieve the above objectives, a first aspect of this application provides a negative electrode plate including: a negative electrode current collector, having a first surface and a second surface opposite each other in a thickness direction of the negative electrode current collector; a first negative electrode film layer located on the first surface side, where the first negative electrode film layer includes first silicon-based negative electrode active material particles, and a grain size $d_1$ of a crystal grain contained in the first silicon-based negative electrode active material particle and a median particle size by volume $D_{v1}50$ of the first silicon-based negative electrode active material particles satisfy: $0.0003 \leq d_1/D_{v1}50 \leq 0.004$; and a second negative electrode film layer located on the second surface side, where the second negative electrode film layer includes second silicon-based negative electrode active material particles, and a grain size $d_2$ of a crystal grain contained in the second silicon-based negative electrode active material particles and a median particle size by volume $D_{v2}50$ of the second silicon-based negative electrode active material particles satisfy: $0.0002 \leq d_2/D_{v2}50 \leq 0.002$; where a capacity $C_1$ per unit area of the first negative electrode film layer and a capacity $C_2$ per unit area of the second negative electrode film layer satisfy: $mAh/(g \cdot mm^2) \leq C_2 < C_1 \leq 0.2\ mAh/(g \cdot mm^2)$.

When the negative electrode plate of this application is applied to an electrode assembly with a wound structure, the first negative electrode film layer is located on the outer surface of the negative electrode plate, and the second negative electrode film layer is located on the inner surface of the negative electrode plate, the energy density, safety performance, and long-term cycling performance of the secondary battery can be significantly improved. When the negative electrode plate of this application is applied to an electrode assembly with a stacked structure, the energy density and long-term cycling performance of the secondary battery can be significantly improved.

Without being limited to any theory or explanation, when the ratio of the grain size of the crystal grain contained in the silicon-based negative electrode active material to the median particle size by volume of the silicon-based negative electrode active material particles is 0.0003 to 0.004, during the charge-discharge cycle, the oxidation reaction of the silicon-based negative electrode active material can be reduced, so that the silicon-based negative electrode active material particles have high capacity performance, thereby improving the energy density of the secondary battery. When the ratio of the grain size of the crystal grain contained in the silicon-based negative electrode active material to the median particle size by volume of the silicon-based negative electrode active material particles is 0.0002 to 0.002, during intercalation of active lithium ions into the silicon-based negative electrode active material particles, small stress can be generated inside the silicon-based negative electrode active material particles, which can reduce the risk of cracks inside the silicon-based negative electrode active material particles, and reduce the possibility of ruptures of the second silicon-based negative electrode active material particles and in turn the possibility of side reactions with the electrolyte, thereby improving the cycling performance of the secondary battery.

When the negative electrode plate of this application is applied to an electrode assembly with a wound structure, with the first negative electrode film layer located on the outer surface of the negative electrode plate and the second negative electrode film layer located on the inner surface of the negative electrode plate, since the first film layer has a larger capacity per unit area, it can still have a high capacity per unit area after winding. As a result, the negative electrode film layer located on the outer surface of the negative electrode plate can accommodate more active lithium ions, thereby reducing the risk of lithium precipitation on the surface of the negative electrode plate.

Further, when $d_1/D_{v1}50$ is within the above appropriate range, the first silicon-based negative electrode active material particles in the first negative electrode film layer can exhibit higher capacity performance. This not only helps to improve the capacity per unit area of the negative electrode film layer located on the outer surface of the negative electrode plate and further improve the safety performance of the secondary battery, but also helps to improve the initial coulombic efficiency of the secondary battery.

Correspondingly, when $d_2/D_{v2}50$ is within the above appropriate range, the second silicon-based negative electrode active material particles in the second negative electrode film layer can have a low volume swelling rate. This helps to reduce the risk of pulverization and inactivation of the silicon-based negative electrode active material particles, thereby enabling the secondary battery to have good long-term cycling performance.

Therefore, when the negative electrode plate of this application is applied to an electrode assembly with a wound structure, with the first negative electrode film layer located on the outer surface of the negative electrode plate and the second negative electrode film layer located on the inner surface of the negative electrode plate, the silicon-based negative electrode active material can have high capacity performance and small average volume swelling rate, and the negative electrode film layer located on the outer surface of the negative electrode plate has high capacity per unit area. As a result, the energy density, safety performance, and long-term cycling performance of the secondary battery can be significantly improved.

Similarly, when the negative electrode plate of this application is applied to an electrode assembly with a stacked structure, the first silicon-based negative electrode active material can have high capacity performance, thereby helping to improve the energy density of the secondary battery; and the second silicon-based negative electrode active material particles have a low volume swelling rate, thereby helping to reduce the average volume swelling rate of the silicon-based negative electrode active material particles. As a result, the energy density and long-term cycling performance of the secondary battery can be significantly improved.

In any embodiment of this application, $D_{v1}50$ is 6 μm-10 μm, optionally 6.5 μm-9 μm. When the negative electrode plate of this application is applied to an electrode assembly with a wound structure, with the first negative electrode film layer located on the outer surface of the negative electrode plate and the second negative electrode film layer located on the inner surface of the negative electrode plate, and $D_{v1}50$ is within the above appropriate range, it is beneficial to reduce the active lithium ions consumed in forming the SEI film, and also beneficial to improve the capacity performance of the first silicon-based negative electrode active material. This not only helps to reduce the risk of lithium precipitation on the outer surface of the negative electrode plate and improve the safety performance of the secondary battery, but also helps to improve the initial coulombic efficiency and long-term cycling performance of the secondary battery.

In any embodiment of this application, 5 nm≤$d_1$≤12 nm, optionally 7 nm≤$d_1$≤12 nm. When the grain size of the crystal grains contained in the first silicon-based negative electrode active material particles is within an appropriate range, the risk of oxidation of the first silicon-based negative electrode active material particles can be reduced, which improves the capacity performance of the first silicon-based negative electrode active material particles to provide more lithium intercalation sites for lithium ions and reduce the generation of lithium dendrites, thereby improving the safety performance of the secondary battery.

In any embodiment of this application, $D_{v2}50$ is 2.5 μm-5.5 μm, optionally 3 μm-5 μm. When the negative electrode plate of this application is applied to an electrode assembly with a wound structure, with the first negative electrode film layer located on the outer surface of the negative electrode plate and the second negative electrode film layer located on the inner surface of the negative electrode plate, and $D_{v2}50$ within the above appropriate range, it is beneficial to shorten the lithium ion transport path of the negative electrode film layer on the inner surface of the negative electrode plate and further reduce the volume swelling of the second silicon-based negative electrode active material particles, thereby helping to further reduce the electrochemical polarization and improving the cycling stability of the secondary battery.

In any embodiment of this application, 3 nm≤$d_2$≤5 nm, optionally 3.5 nm≤$d_2$≤5 nm. When the grain size of the crystal grain contained in the second silicon-based negative electrode active material particles is within an appropriate range, during the cycling of the secondary battery, when the second silicon-based negative electrode active material particles undergo volume swelling, the crystal grains inside exert less extrusion on the second silicon-based negative electrode active material particles, thereby slowing down the damage to the second silicon-based negative electrode active material particles and extending the cycle life of the battery.

In any embodiment of this application, 0.2≤$D_{v2}50/D_{v1}50$≤0.9, optionally 0.3≤$D_{v2}50/D_{v1}50$≤0.8. When the value of $D_{v2}50/D_{v1}50$ is within the above appropriate range, the secondary battery can have both high energy density and good long-term cycling performance. Particularly, when the negative electrode plate of this application is applied to an electrode assembly with a wound structure, with the first negative electrode film layer located on the outer surface of the negative electrode plate and the second negative electrode film layer located on the inner surface of the negative electrode plate, the risk of lithium precipitation on the surface of the negative electrode plate can also be reduced, enabling the secondary battery to further have high safety performance.

In any embodiment of this application, 0.7≤$C_2/C_1$≤0.9, optionally 0.75≤$C_2/C_1$≤0.85. When the negative electrode plate of this application is applied to an electrode assembly with a wound structure, with the first negative electrode film layer located on the outer surface of the negative electrode plate and the second negative electrode film layer located on the inner surface of the negative electrode plate, and the ratio of $C_1$ and $C_2$ is within the above appropriate range, the secondary battery can have both high energy density and high safety performance.

In any embodiment of this application, the first silicon-based negative electrode active material particles and the second silicon-based negative electrode active material particles are selected from a same type of silicon-based negative electrode active material particles, and a gram capacity of the first silicon-based negative electrode active material is greater than a gram capacity of the second silicon-based negative electrode active material. When the gram capacity of the first silicon-based negative electrode active material particles is greater than the gram capacity of the second silicon-based negative electrode active material particles, it is easier to adjust the ratio of the unit area capacity of the first negative electrode film layer to the second negative electrode film layer within the range specified in this application; on the other hand, it helps control the ratio of the volume expansion rate of the first silicon-based negative electrode active material particles to the second silicon-based negative electrode active material particles within an appropriate range. This helps to improve the long-term cycling performance of the secondary battery, and improve the safety performance of the secondary battery using the electrode assembly with a wound structure.

In any embodiment of this application, the first negative electrode film layer further includes a third negative electrode active material, where the third negative electrode active material is selected from artificial graphite, natural graphite, hard carbon, soft carbon, or a combination thereof.

In any embodiment of this application, the second negative electrode film layer further includes a fourth negative electrode active material, where the fourth negative electrode active material is selected from artificial graphite, natural graphite, hard carbon, soft carbon, or a combination thereof.

When the negative electrode film layer includes other negative electrode active materials in addition to the silicon-based negative electrode active material particles, this not only facilitates the adjustment of the capacity per unit area of the negative electrode film layer to make the negative electrode film layer meet the requirements of this application, but also helps to flexibly adjust parameters of the negative electrode film layer such as the compacted density and porosity through combination of the silicon-based negative electrode active material particles with the other negative electrode active materials, thereby improving the safety performance and electrochemical performance of the secondary battery.

In any embodiment of this application, based on a total mass of the first silicon-based negative electrode active material particles and the third negative electrode active material, a mass percentage of the first silicon-based negative electrode active material particles is 10%-30%, optionally 12%-25%. When the mass percentage of the first silicon-based negative electrode active material particles in the negative electrode active material of the first negative electrode film layer is within the above appropriate range, this not only allows the first negative electrode film layer to have high energy density, but also reduces the volume swelling of the first negative electrode film layer generated during the charge-discharge cycle of the secondary battery. As a result, the secondary battery can have high energy density, high safety performance, and good long-term cycling performance.

In any embodiment of this application, based on a total mass of the second silicon-based negative electrode active material particles and the fourth negative electrode active material, a mass percentage of the second silicon-based negative electrode active material particles is 10%-30%, optionally 12%-25%. When the mass percentage of the second silicon-based negative electrode active material particles in the negative electrode active material of the second negative electrode film layer is within the above appropriate range, this not only allows the second negative electrode film layer to have high energy density, but also reduces the volume swelling of the second negative electrode film layer generated during the charge-discharge cycle of the secondary battery. As a result, the secondary battery can have high energy density, high safety performance, and good long-term cycling performance.

A second aspect of this application provides an electrode assembly including the negative electrode plate according to the first aspect of this application.

The electrode assembly of this application includes the negative electrode plate according to the first aspect of this application, and when applied to a secondary battery, at least enables the secondary battery to have high energy density and good long-term cycling performance.

In any embodiment of this application, the positive electrode plate of the electrode assembly includes: a positive electrode current collector, and a first positive electrode film layer and a second positive electrode film layer respectively located on two sides of the positive electrode current collector.

The negative electrode plate and the positive electrode plate, with a separator in between, are wound along a winding direction to form a wound structure, where the first positive electrode film layer is disposed opposite the first negative electrode film layer with the separator in between, and the second positive electrode film layer is disposed opposite the second negative electrode film layer with the separator in between.

The first positive electrode film layer is located on an outer side of the first negative electrode film layer, and the second positive electrode film layer is located on an inner side of the second negative electrode film layer.

In the negative electrode plate of the electrode assembly of this application, its first film layer has a larger capacity per unit area, and can still have a high capacity per unit area after winding. As a result, the negative electrode film layer located on the outer surface of the negative electrode plate can accommodate more active lithium ions, thereby reducing the risk of lithium precipitation on the surface of the negative electrode plate. Further, compared to the second negative electrode film layer, the silicon-based negative electrode material particles contained in the first negative electrode film layer have a larger median particle size by volume, thereby exhibiting higher capacity performance. This not only helps to improve the capacity per unit area of the negative electrode film layer located on the outer surface of the negative electrode plate and further improve the safety performance of the secondary battery, but also helps to improve the initial coulombic efficiency of the secondary battery. Correspondingly, the silicon-based negative electrode active material particles contained in the second negative electrode film layer have a smaller median particle size by volume, resulting in a low volume swelling rate and a short transport path for lithium ions. This helps to reduce the risk of pulverization and inactivation of the silicon-based negative electrode active material particles and electrochemical polarization, enabling the secondary battery to have good long-term cycling performance. Therefore, the electrode assembly of this application, when applied to a secondary battery, can significantly improve the energy density, safety performance, and long-term cycling performance of the secondary battery.

In any embodiment of this application, the wound structure includes a bending region and a straight region connected to the bending region.

The negative electrode plate includes a plurality of bending portions in the bending region and a plurality of straight portions in the straight region, two ends of the straight portion connected to the bending portions respectively.

At least one bending portion in the negative electrode plate is a first bending portion, at least one straight portion in the negative electrode plate is a first straight portion connected to the first bending portion, and the first bending portion and the first straight portion satisfy: $C_3 > C_4$, where $C_3$ represents an active material capacity per unit area of the first negative electrode film layer in the first bending portion; and $C_4$ represents an active material capacity per unit area of the first negative electrode film layer in the first straight portion. The positive electrode film layer facing the bending portion of the negative electrode plate with the separator in between has a higher capacity than that of the positive electrode film layer facing the straight portion of the negative electrode plate with the separator in between, making the capacity of the negative electrode film layer in the bending portion greater than that in the straight portion, thereby reducing the risk of lithium precipitation in the bending portion.

In any embodiment of this application, the electrode assembly satisfies: $CB_1 > CB_2 > 1$, where $CB_1$ represents a ratio of a capacity of the first negative electrode film layer to a capacity of the first positive electrode film layer; and $CB_2$ represents a ratio of an active material capacity in the second negative electrode film layer to a capacity of the second positive electrode film layer. When $CB_1$ and $CB_2$ satisfy the above condition, the lithiation pressure of the first negative electrode film layer can be alleviated, and the risk of lithium precipitation can be reduced, thereby helping to improve the safety performance of the secondary battery.

In any embodiment of this application, $0.7 \leq CB_2/CB_1 \leq 0.99$, optionally $0.75 \leq CB_2/CB_1 \leq 0.98$. When $CB_2$ and $CB_1$ satisfy the above relationship, the risk of lithium precipitation on the surfaces of the first negative electrode film layer and the second negative electrode film layer can be reduced, thereby helping to improve the safety performance of the secondary battery.

A third aspect of this application provides a battery cell including a housing and the electrode assembly according to the second aspect of this application, where the electrode assembly is accommodated in the housing.

The battery cell of this application includes the electrode assembly according to the second aspect of this application and can at least have high energy density and good long-term cycling performance.

A fourth aspect of this application provides a battery including a plurality of battery cells according to the third aspect of this application.

A fifth aspect of this application provides an electric apparatus including the battery cell according to the third aspect of this application, where the battery cell is configured to supply electrical energy.

The battery and electric apparatus of this application include the battery cell provided in this application, and therefore at least have the same advantages as the battery cell.

DESCRIPTION OF DRAWINGS

To describe the technical solutions in the embodiments of this application more clearly, the following briefly describes the accompanying drawings required for describing the embodiments of this application. Apparently, the accompanying drawings in the following description show merely some embodiments of this application, and a person of ordinary skills in the art may still derive other drawings from the accompanying drawings without creative efforts.

Figure 1:
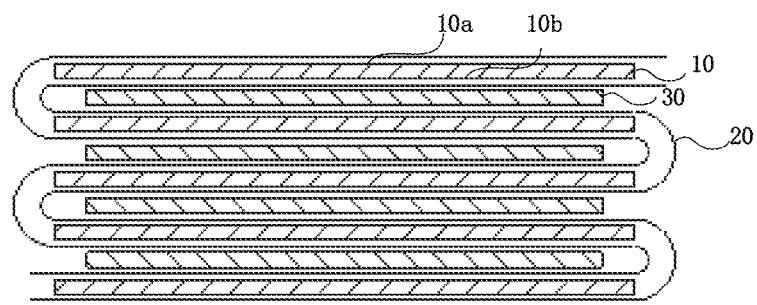
FIG. 1 is a schematic diagram of an embodiment of an electrode assembly according to this application.

DESCRIPTION OF REFERENCE SIGNS 10 negative electrode plate; 10a first surface; 10b second surface; 10c outer surface of negative electrode plate; 10d inner surface of the negative electrode plate; 20 separator; 30 positive electrode plate; 30a inner surface of positive electrode plate; 30b outer surface of positive electrode plate; 1 battery pack; 2 upper box body; 3 lower box body; 4 battery module; 5 battery cell; 51 shell; 52 electrode assembly; and 53 cover plate.

DETAILED DESCRIPTION

To make the objectives, technical solutions, and beneficial technical effects of this application clearer, the following further describes this application in detail with reference to the embodiments. It should be understood that the embodiments described in this specification are merely intended to interpret this application, but not intended to limit this application.

For simplicity, only some numerical ranges are explicitly disclosed in this specification. However, any lower limit may be combined with any upper limit to form a range not explicitly recorded; any lower limit may be combined with another lower limit to form a range not explicitly recorded; and likewise, any upper limit may be combined with any other upper limit to form a range not explicitly recorded. In addition, although not explicitly recorded, each point or individual value between end points of a range is included in the range. Therefore, each point or individual value may itself be a lower limit or upper limit to be combined with any other point or individual value or combined with any other lower limit or upper limit to form a range not explicitly recorded.

In the description of this specification, it should be noted that "more than" and "less than" are inclusive of the present number and that "more" in "one or more" means two or more than two, unless otherwise stated.

In the description of this specification, unless otherwise stated, the term "or" is inclusive. For example, the phrase "A or B" means "A, B, or both A and B". More specifically, any one of the following conditions satisfies the condition "A or B": A is true (or present) and B is false (or not present); A is false (or not present) and B is true (or present); or both A and B are true (or present).

It should be understood that relational terms such as "first" and "second" are used only to differentiate an entity or operation from another entity or operation, and do not necessarily require or imply that any actual relationship or sequence exists between these entities or operations.

The foregoing invention content of this application is not intended to describe each of the disclosed embodiments or implementations of this application. The following description illustrates example embodiments in more detail by using examples. Throughout this application, guidance is provided by using a series of embodiments, and these embodiments may be used in various combinations. In the examples, enumeration is merely representative but should not be interpreted as exhaustive.

As described in the background, improving the energy density, safety performance, and long-term cycling performance of secondary batteries is an important direction for the development of secondary batteries.

The gram capacity of silicon-based materials is much higher than that of carbon materials, making them highly promising negative electrode active materials. However, the volume swelling of silicon-based materials during charging negatively affects their capacity performance as well as the cycling performance and safety performance of secondary batteries.

In addition, lithium precipitation is also one of the urgent safety issues to be addressed in the field of secondary batteries. During the charging process, lithium ions are deintercalated from the positive electrode and intercalated into the negative electrode. When the deintercalation speed of lithium ions from the positive electrode is faster than the intercalation speed of lithium ions into the negative electrode, or the total amount of lithium ions deintercalated from the positive electrode is greater than the total amount of lithium ions that can be accommodated in the negative electrode, the lithium ions that cannot be promptly intercalated into the negative electrode can only receive electrons on the surface of the negative electrode plate and be reduced to form lithium metal, which is the phenomenon of lithium precipitation. Lithium precipitation degrades the performance of secondary batteries, for example, significantly reducing the cycle life. Moreover, as lithium precipitation continues, lithium metal will grow into a tree-like structure, known as lithium dendrites. The growth of lithium dendrites can damage the solid electrolyte interface (solid electrolyte interface, SEI) film on the surface of the negative electrode active material, causing irreversible consumption of active ions. The growth of lithium dendrites can also pierce the separator and cause internal short circuits, possibly resulting in combustion, explosion, or other safety risks.

Particularly, for secondary batteries using silicon-based materials as negative electrode active materials, during the charge-discharge cycle, the volume swelling and shrinkage of silicon-based materials can cause pulverization and deactivation of some silicon-based materials. Consequently, as the charge-discharge cycle proceeds, the capacity of the negative electrode decays, thereby exacerbating the risk of lithium precipitation on the negative electrode.

Therefore, inhibiting the volume swelling of silicon-based materials and reducing the lithium precipitation phenomenon in the secondary batteries using silicon-based materials as negative electrode active materials is one of the promising research directions for improving the energy density, cycling performance, and safety performance of secondary batteries.

In related technologies, in order to reduce the volume swelling of silicon-based materials, silicon-based negative electrode active material particles are typically coated, and the volume swelling of silicon-based materials is inhibited through the coating. However, coating silicon-based materials not only requires complex processes, but also does not have an ideal inhibition effect on the volume swelling of silicon-based materials.

In view of this, through in-depth research and extensive experiments, the inventors have provided a negative electrode plate and an electrode assembly, a battery cell, a battery, and an electric apparatus containing the same.

Negative Electrode Plate

A first aspect of this application provides a negative electrode plate including: a negative electrode current collector, having a first surface and a second surface opposite each other in a thickness direction of the negative electrode current collector; a first negative electrode film layer located on the first surface side, where the first negative electrode film layer includes first silicon-based negative electrode active material particles, and a grain size $d_1$ of a crystal grain contained in the first silicon-based negative electrode active material particle and a median particle size by volume $D_{v1}50$ of the first silicon-based negative electrode active material particles satisfy: $0.0003 \leq d_1/D_{v1}50 \leq 0.004$; and a second negative electrode film layer located on the second surface side, where the second negative electrode film layer includes second silicon-based negative electrode active particles, and a grain size $d_2$ of a crystal grain contained in the second silicon-based negative electrode active material particles and a median particle size by volume $D_{v2}50$ of the second silicon-based negative electrode active material particles satisfy: $0.0002 \leq d_2/D_{v2}50 \leq 0.002$. For example, $d_1/D_{v1}50$ may be 0.0003, 0.0005, 0.0008, 0.001, 0.0015, 0.002, 0.0025, 0.003, 0.0035, 0.004, or within a range defined by any above values; and $d_2/D_{v2}50$ may be 0.0002, 0.0005, 0.0008, 0.001, 0.0012, 0.0015, 0.0018, 0.002, or within a range defined by any above values.

A capacity $C_1$ per unit area of the first negative electrode film layer and a capacity $C_2$ per unit area of the second negative electrode film layer satisfy: $0.005$ mAh/(g·mm$^2$)$\leq C_2 < C_1 \leq 0.2$ mAh/(g·mm$^2$).

The first silicon-based negative electrode active material particles and the second silicon-based active material particles may be a same type of silicon-based negative electrode active material or different types of silicon-based negative electrode active materials. This application does not limit the types of the silicon-based negative electrode active material, which may include silicon-based negative electrode active materials known in the art. In some embodiments, the first silicon-based negative electrode active material particles and the second silicon-based negative electrode active material particles may be each independently selected from one or more of pre-lithiated or non-prelithiated silicon particles, pre-lithiated or non-prelithiated silicon oxide composite particles, pre-lithiated or non-prelithiated silicon carbon composite particles, or pre-lithiated or non-prelithiated silicon alloy particles.

This application does not exclude the possibility that the first negative electrode film layer and the second negative electrode film layer may further include other negative electrode active materials. The other negative electrode active materials may include negative electrode active materials known in the art that can be used for secondary batteries, for example, may include but is not limited to carbon-based negative electrode materials and tin-based negative electrode materials. The above $C_1$ and $C_2$ can be achieved by adjusting the thicknesses of the first negative electrode film layer and the second negative electrode film layer, the percentage of the negative electrode active material in the film layer, the composition of the negative electrode active material, or the like, which is not limited herein. For example, in some embodiments, in a case that the mass percentages of the negative electrode active material in the first negative electrode film layer and the second negative electrode film layer, the composition of the negative electrode active material, and the like remain unchanged, the thickness of the first negative electrode film layer can be adjusted to be greater than the thickness of the second negative electrode film layer, so as to make $C_2 < C_1$. In some embodiments, in a case that the thicknesses of the first negative electrode film layer and the second negative electrode film layer, the composition of the negative electrode active material, and the like remain unchanged, the mass percentage of the negative electrode active material in the first negative electrode film layer can be adjusted to be greater than the percentage of the negative electrode active material in the second negative electrode film layer, so as to make $C_2 < C_1$. In some embodiments, in a case that the thicknesses of the first negative electrode film layer and the second negative electrode film layer, the mass percentages of the negative electrode active material in the film layers, and the like remain unchanged, the compositions of the negative electrode active material in the first negative electrode film layer and the second negative electrode film layer can be adjusted, for example, by adding different types of other negative electrode active materials, so as to make $C_2 < C_1$.

The negative electrode plate of this application may be applied to an electrode assembly with a wound structure, with the first negative electrode film layer located on the outer surface of the negative electrode plate and the second negative electrode film layer located on the inner surface of the negative electrode plate. The negative electrode plate of this application may also be applied to an electrode assembly with a stacked structure. In the electrode assembly with a stacked structure, positions of the first negative electrode film layer and the second negative electrode film layer are not specifically limited.

Although the mechanism is not clear, the inventors have accidentally found that: when the negative electrode plate of this application is applied to an electrode assembly with a wound structure, with the first negative electrode film layer located on the outer surface of the negative electrode plate and the second negative electrode film layer located on the inner surface of the negative electrode plate, the energy density, safety performance, and long-term cycling performance of the secondary battery can be significantly improved; and when the negative electrode plate of this application is applied to an electrode assembly with a stacked structure, the energy density and long-term cycling performance of the secondary battery can be significantly improved.

Without being limited to any theory or explanation, the inventors have found that when the ratio of the grain size of the crystal grain contained in the silicon-based negative electrode active material to the median particle size by volume of the silicon-based negative electrode active material particles is 0.0003 to 0.004, during the charge-discharge cycle, the oxidation reaction of the silicon-based negative electrode active material can be reduced, so that the silicon-based negative electrode active material particles have high capacity performance, thereby improving the energy density of the secondary battery. When the ratio of the grain size of the crystal grain contained in the silicon-based negative electrode active material to the median particle size by volume of the silicon-based negative electrode active material particles is 0.0002 to 0.002, during intercalation of active lithium ions into the silicon-based negative electrode active material particles, small stress can be generated inside the silicon-based negative electrode active material particles, which can reduce the risk of cracks inside the silicon-based negative electrode active material particles, and reduce the possibility of ruptures of the second silicon-based negative electrode active material particles and in turn the possibility of side reactions with the electrolyte, thereby improving the cycling performance of the secondary battery.

In the electrode plate of the electrode assembly with a wound structure, the electrode film layer on the outer surface, especially the electrode film layer on the outer surface of the bending portion of the electrode assembly, is stretched during the winding process, making the capacity per unit area less than that before winding. Correspondingly, the electrode film layer at the corner of the inner surface, especially the electrode film layer on the inner surface of the bending portion of the electrode assembly, is compressed during the winding process, making the capacity per unit area greater than that before winding. An electrochemical reaction takes place between the negative electrode film layer on the outer side of the negative electrode plate and the positive electrode film layer directly opposite the negative electrode film layer across the separator. The positive electrode film layer directly opposite the negative electrode film layer is a positive electrode film layer on the inner side of the positive electrode plate. As a result, lithium precipitation may occur on the surface of the negative electrode plate due to the capacity of the negative electrode film layer being less than the capacity of the positive electrode film layer. Therefore, compared to the inner surface of the negative electrode plate, the outer surface of the negative electrode plate is more prone to lithium precipitation. When the negative electrode plate of this application is applied to an electrode assembly with a wound structure, with the first negative electrode film layer located on the outer surface of the negative electrode plate and the second negative electrode film layer located on the inner surface of the negative electrode plate, since the first film layer has a larger capacity per unit area, it can still have a high capacity per unit area after winding. As a result, the negative electrode film layer located on the outer surface of the negative electrode plate can accommodate more active lithium ions, thereby reducing the risk of lithium precipitation on the surface of the negative electrode plate.

Further, when $d_1/D_{v1}50$ is within the above appropriate range, the first silicon-based negative electrode active material particles in the first negative electrode film layer can exhibit higher capacity performance. This not only helps to improve the capacity per unit area of the negative electrode film layer located on the outer surface of the negative electrode plate and further improve the safety performance of the secondary battery, but also helps to improve the initial coulombic efficiency of the secondary battery. Correspondingly, when $d_2/D_{v2}50$ is within the above appropriate range, the second silicon-based negative electrode active material particles in the second negative electrode film layer can have a low volume swelling rate. This helps to reduce the risk of pulverization and inactivation of the silicon-based negative electrode active material particles, thereby enabling the secondary battery to have good long-term cycling performance.

Therefore, when the negative electrode plate of this application is applied to an electrode assembly with a wound structure, with the first negative electrode film layer located on the outer surface of the negative electrode plate and the second negative electrode film layer located on the inner surface of the negative electrode plate, the silicon-based negative electrode active material can have high capacity performance and small average volume swelling rate, and the negative electrode film layer located on the outer surface of the negative electrode plate has high capacity per unit area. As a result, the energy density, safety performance, and long-term cycling performance of the secondary battery can be significantly improved.

Similarly, when the negative electrode plate of this application is applied to an electrode assembly with a stacked structure, the first silicon-based negative electrode active material can have high capacity performance, thereby helping to improve the energy density of the secondary battery; and the second silicon-based negative electrode active material particles have a low volume swelling rate, thereby helping to reduce the average volume swelling rate of the silicon-based negative electrode active material particles. As a result, the energy density and long-term cycling performance of the secondary battery can be significantly improved.

In some embodiments, $D_{v1}50$ may be 6 μm-10 μm, for example, $D_{v1}50$ may be 6 μm, 7 μm, 8 μm, 9 μm, 10 μm, or within a range defined by any above values. Optionally, $D_{v1}50$ may be 6.5 μm-9 μm, for example, $D_{v1}50$ may be 6.5 μm, 7 μm, 7.5 μm, 8 μm, 8.5 μm, 9 μm, or within a range defined by any above values.

Without being limited to any theory or explanation, when the negative electrode plate of this application is applied to an electrode assembly with a wound structure, with the first negative electrode film layer located on the outer surface of the negative electrode plate and the second negative electrode film layer located on the inner surface of the negative electrode plate, and $D_{v1}50$ is within the above appropriate range, on the one hand, the first silicon-based negative electrode active material particles can have a suitable specific surface area, thereby reducing the active lithium ions consumed for forming the SEI film; on the other hand, the first silicon-based negative electrode active material particles can have a suitable volume swelling rate, so that they are less prone to oxidation and have high capacity performance. This not only helps to reduce the risk of lithium precipitation on the outer surface of the negative electrode plate and improve the safety performance of the secondary battery, but also helps to improve the initial coulombic efficiency and long-term cycling performance of the secondary battery.

In some embodiments, a grain size $d_1$ of a crystal grain contained in the first silicon-based negative electrode active material particles may satisfy: 5 nm≤$d_1$≤12 nm, for example, $d_1$ may be 5 nm, 6 nm, 7 nm, 8 nm, 9 nm, 10 nm, 11 nm, 12 nm, or within a range defined by any above values. Optionally, 7 nm≤$d_1$≤12 nm, for example, $d_1$ may be 7 nm, 7.5 nm, 8 nm, 8.5 nm, 9 nm, 9.5 nm, 10 nm, 10.5 nm, 11 nm, 11.5 nm, 12 nm, or within a range defined by any above values.

When the grain size of the crystal grains contained in the first silicon-based negative electrode active material particles is within the above range, it can reduce the risk of oxidation of the first silicon-based negative electrode active material particles, thereby enhancing the capacity performance of the first silicon-based negative electrode active material particles, providing more lithium intercalation sites for lithium ions, thereby reducing the formation of lithium dendrites, and improving the safety performance of the secondary battery.

In some embodiments, $D_{v2}50$ may be 2.5 μm-5.5 μm, for example, $D_{v2}50$ may be 2.5 μm, 3 μm, 3.5 μm, 4 μm, 4.5 μm, 5 μm, 5.5 μm, or within a range defined by any above values. Optionally, $D_{v2}50$ may be 3 μm-5 μm, for example, $D_{v2}50$ may be 3 μm, 3.5 μm, 4 μm, 4.5 μm, 5 μm, or within a range defined by any above values.

Without being limited to any theory or explanation, when the negative electrode plate of this application is applied to an electrode assembly with a wound structure, with the first negative electrode film layer located on the outer surface of the negative electrode plate and the second negative electrode film layer located on the inner surface of the negative electrode plate, and $D_{v2}50$ within the above appropriate range, it is beneficial to shorten the lithium ion transport path of the negative electrode film layer on the inner surface of the negative electrode plate and further reduce the volume swelling of the second silicon-based negative electrode active material particles, thereby helping to further reduce the electrochemical polarization and improving the cycling stability of the secondary battery.

In some embodiments, a grain size $d_2$ of a crystal grain contained in the second silicon-based negative electrode active material particles may satisfy: 3 nm≤$d_2$≤5 nm, for example, $d_2$ may be 3 nm, 3.5 nm, 4 nm, 4.5 nm, 5 nm, or within a range defined by any above values. Optionally, 3.5 nm≤$d_2$≤5 nm, for example, $d_2$ may be 3.5 nm, 3.8 nm, 4 nm, 4.2 nm, 4.5 nm, 4.8 nm, 5 nm, or within a range defined by any above values.

When the grain size of the crystal grain contained in the second silicon-based negative electrode active material particles is within the above range, during the cycling of the secondary battery, when the second silicon-based negative electrode active material particles undergo volume swelling, the crystal grains inside exert less extrusion on the second silicon-based negative electrode active material particles, thereby slowing down the damage to the second silicon-based negative electrode active material particles and extending the cycle life of the battery.

In some embodiments, the median particle size by volume $D_{v1}50$ of the first silicon-based negative electrode active material particles and the median particle size by volume $D_{v2}50$ of the second silicon-based negative electrode active material particles may satisfy: $0.2 \leq D_{v2}50/D_{v1}50 \leq 0.9$, for example, $D_{v2}50/D_{v1}50$ may be 0.2, 0.3, 0.4, 0.5, 0.6, 0.7, 0.8, 0.9, or within a range defined by any above values. Optionally, $0.3 \leq D_{v2}50/DV_150 \leq 0.8$, for example, $D_{v2}50/DV_150$ may be 0.3, 0.35, 0.4, 0.45, 0.5, 0.55, 0.6, 0.65, 0.7, 0.75, 0.8, or within a range defined by any above values.

Without being limited to any theory or explanation, when the value of $D_{v2}50/DV_150$ is within the above appropriate range, the risk of the median particle size by volume of the first silicon-based negative electrode active material particles being too large or the median particle size by volume of the second silicon-based negative electrode active material particles being too small can be reduced. This allows the first silicon-based negative electrode active material particles to have high capacity performance and allows the second silicon-based negative electrode active material particles to have a low volume swelling rate and a short lithium ion transport path. As a result, when the negative electrode plate of this application is applied to a secondary battery, the secondary battery can have both high energy density and good long-term cycling performance. Particularly, when the negative electrode plate of this application is applied to an electrode assembly with a wound structure, with the first negative electrode film layer located on the outer surface of the negative electrode plate and the second negative electrode film layer located on the inner surface of the negative electrode plate, the risk of lithium precipitation on the surface of the negative electrode plate can also be reduced, enabling the secondary battery to further have high safety performance.

In some embodiments, the capacity $C_1$ per unit area of the first negative electrode film layer and the capacity $C_2$ per unit area of the second negative electrode film layer may satisfy: $0.7 \leq C_2/C_1 \leq 0.9$, for example, $C_2/C_1$ may be 0.7, 0.75, 0.8, 0.85, 0.9, or within a range defined by any above values. Optionally, $0.75 \leq C_2/C_1 \leq 0.85$, for example, $C_2/C_1$ may be 0.75, 0.78, 0.8, 0.82, 0.85, or within a range defined by any above values.

Without being limited to any theory or explanation, when the negative electrode plate of this application is applied to an electrode assembly with a wound structure, with the first negative electrode film layer located on the outer surface of the negative electrode plate and the second negative electrode film layer located on the inner surface of the negative electrode plate, and the ratio of $C_1$ and $C_2$ is within the above appropriate range, the secondary battery can have both high energy density and high safety performance. On the one hand, when the capacity per unit area of the negative electrode film layer on the outer surface of the negative electrode plate is constant, the ratio of $C_1$ to $C_2$ within the above appropriate range can ensure that the negative electrode film layer on the inner surface of the negative electrode plate has a suitable capacity per unit area, thereby reducing the risk of lithium precipitation on the inner surface of the negative electrode plate caused by the negative electrode film layer on the inner surface having an excessively low capacity per unit area, and improving the safety performance of the secondary battery. On the other hand, when the capacity per unit area of the negative electrode film layer on the inner surface of the negative electrode plate is constant, the ratio of $C_1$ to $C_2$ within the above appropriate range can ensure that the negative electrode film layer on the outer surface of the negative electrode plate has a suitable capacity per unit area, thereby reducing the waste of negative electrode capacity caused by the excessively high capacity per unit area of the negative electrode film layer on the outer surface, and improving the energy density of the secondary battery.

In some embodiments, the first silicon-based negative electrode active material particles and the second silicon-based negative electrode active material particles are selected from a same type of silicon-based negative electrode active material particles. For example, the first silicon-based negative electrode active material particles may be first silicon particles, and the second negative electrode active material particles may be second silicon particles. A gram capacity of the first silicon-based negative electrode active material may be greater than a gram capacity of the second silicon-based negative electrode active material.

Without being limited to any theory or explanation, when the gram capacity of the first silicon-based negative electrode active material particles is greater than the gram capacity of the second silicon-based negative electrode active material particles, it is easier to adjust the ratio of the capacity per unit area of the first negative electrode film layer to the capacity per unit area of the second negative electrode film layer to be within the range specified in this application. This also helps to control the ratio of the volume swelling rate of the first silicon-based negative electrode active material particles to the volume swelling rate of the second silicon-based negative electrode active material particles to be within an appropriate range. This helps to improve the long-term cycling performance of the secondary battery, and improve the safety performance of the secondary battery using the electrode assembly with a wound structure. In some embodiments, when the gram capacity of the first silicon-based negative electrode active material particles is greater than the gram capacity of the second silicon-based negative electrode active material particles, the negative electrode plate of this application can be prepared without adjusting the preparation parameters such as the thickness or compacted density of the negative electrode film layer, thereby simplifying the processing technology of the negative electrode plate of this application and improving the production capacity of the negative electrode plate of this application.

In some embodiments, the first negative electrode film layer may further include a third negative electrode active material, where the third negative electrode active material may be selected from artificial graphite, natural graphite, hard carbon, soft carbon, or a combination thereof.

In some embodiments, the second negative electrode film layer may further include a fourth negative electrode active material, where the fourth negative electrode active material may be selected from artificial graphite, natural graphite, hard carbon, soft carbon, or a combination thereof.

Without being limited to any theory or explanation, when the negative electrode film layer includes other negative electrode active materials in addition to the silicon-based negative electrode active material particles, this not only facilitates the adjustment of the capacity per unit area of the negative electrode film layer to make the negative electrode film layer meet the requirements of this application, but also helps to flexibly adjust parameters of the negative electrode film layer such as the compacted density and porosity through combination of the silicon-based negative electrode active material particles with the other negative electrode active materials, thereby improving the safety performance and electrochemical performance of the secondary battery.

In some embodiments, based on a total mass of the first silicon-based negative electrode active material particles and the third negative electrode active material, a mass percentage of the first silicon-based negative electrode active material particles may be 10%-30%, for example, may be 10%, 12%, 15%, 18%, 20%, 22%, 25%, 28%, 30%, or within a range defined by any above values.

Optionally, based on the total mass of the first silicon-based negative electrode active material particles and the third negative electrode active material, the mass percentage of the first silicon-based negative electrode active material particles may be 12%-25%, for example, may be 12%, 14%, 16%, 18%, 20%, 22%, 24%, 25%, or within a range defined by any above values.

Without being limited to any theory or explanation, when the mass percentage of the first silicon-based negative electrode active material particles in the negative electrode active material in the first negative electrode film layer is within the above appropriate range, this not only allows the first negative electrode film layer to have high energy density, but also reduces the volume swelling of the first negative electrode film layer generated during the charge-discharge cycle of the secondary battery, thereby reducing the overall volume swelling of the secondary battery. As a result, the secondary battery can have high energy density, high safety performance, and good long-term cycling performance.

In some embodiments, based on a total mass of the second silicon-based negative electrode active material particles and the fourth negative electrode active material, a mass percentage of the second silicon-based negative electrode active material particles may be 10%-30%, for example, may be 10%, 12%, 15%, 18%, 20%, 22%, 25%, 28%, 30%, or within a range defined by any above values.

Optionally, based on the total mass of the second silicon-based negative electrode active material particles and the fourth negative electrode active material, the mass percentage of the second silicon-based negative electrode active material particles may be 12%-25%, for example, may be 12%, 14%, 16%, 18%, 20%, 22%, 24%, 25%, or within a range defined by any above values.

Without being limited to any theory or explanation, when the mass percentage of the second silicon-based negative electrode active material particles in the negative electrode active material in the second negative electrode film layer is within the above appropriate range, this not only allows the second negative electrode film layer to have high energy density, but also reduces the volume swelling of the second negative electrode film layer generated during the charge-discharge cycle of the secondary battery, thereby reducing the overall volume swelling of the secondary battery. As a result, the secondary battery can have high energy density, high safety performance, and good long-term cycling performance.

This application does not limit the negative electrode current collector of the negative electrode plate, and the negative electrode current collector may be a metal foil or a composite current collector (the composite current collector can be formed by providing a metal material on a polymer matrix). For example, the metal foil may be a copper foil. The composite current collector may include a polymer material matrix and a metal layer formed on at least one surface of the polymer material matrix. The composite current collector may be formed by forming a metal material (copper, copper alloy, nickel, nickel alloy, titanium, titanium alloy, silver, silver alloy, or the like) on the polymer material matrix (for example, a matrix of polypropylene (PP), polyethylene terephthalate (PET), polybutylene terephthalate (PBT), polystyrene (PS), or polyethylene (PE)).

In some embodiments, the first negative electrode layer and the second negative electrode layer further optionally include a binder. The binder may be selected from at least one of styrene-butadiene rubber (SBR), polyacrylic acid (PAA), polyacrylic acid sodium (PAAS), polyacrylamide (PAM), polyvinyl alcohol (PVA), sodium alginate (SA), polymethacrylic acid (PMAA), and carboxymethyl chitosan (CMCS).

In some embodiments, the first negative electrode layer and the second negative electrode layer further optionally include a conductive agent. The conductive agent may be selected from at least one of superconducting carbon, acetylene black, carbon black, Ketjen black, carbon dots, carbon nanotubes, graphene, and carbon nanofiber.

In some embodiments, the first negative electrode layer and the second negative electrode layer further optionally include other additives, such as a thickener (for example, sodium carboxymethyl cellulose (CMC-Na)).

In some embodiments, the negative electrode plate may be prepared as follows: The components for preparing the negative electrode plate, such as the first silicon-based negative electrode active material particles, the optional graphite, conductive agent, and binder, and any other components, are dispersed in a solvent (such as deionized water) to produce a first negative electrode slurry; the second silicon-based negative electrode active material particles, the optional graphite, conductive agent, and binder, and any other components, are dispersed in a solvent (such as deionized water) to produce a second negative electrode slurry; the first negative electrode slurry is applied onto one surface of the negative electrode current collector, followed by drying, to form a first negative electrode film layer on one surface of the negative electrode current collector; the second negative electrode slurry is applied onto another surface of the negative electrode current collector, followed by drying, to form a second negative electrode film layer; and processes such as drying and cold pressing are performed to obtain the negative electrode plate of this application.

It should be noted that according to this application, in the secondary battery, the negative electrode plate does not exclude other additional functional layers besides the negative electrode film layer. For example, in some embodiments, the negative electrode plate described in this application may further include a conductive primer layer (for example, formed by a conductive agent and a binder) disposed between the negative electrode current collector and the negative electrode film layer. In some other embodiments, the negative electrode plate described in this application further includes a protective layer covering the surface of the negative electrode film layer.

In this application, the first silicon-based negative electrode active material particles and the second silicon-based negative electrode active material particles can be obtained in various ways, which is not limited herein. In an example, the first silicon-based negative electrode active material particles and the second silicon-based negative electrode active material particles meeting the conditions of this application can be selected by conducting XRD testing and median particle size testing on the silicon-based negative electrode active material. In another example, the first silicon-based negative electrode active material particles and the second silicon-based negative electrode active material particles meeting the conditions of this application can be prepared based on the preparation method of silicon-based negative electrode active material particles known in the art by controlling the particle size, preparation temperature, and the like of the silicon-based negative electrode active material particles.

In this application, the capacity per unit area of the first negative electrode film layer and the capacity per unit area of the second negative electrode film layer have meanings known in the art and can be measured using the methods and instruments known in the art. For example, the capacity per unit area of the first negative electrode film layer can be measured as follows: The negative electrode plate is punched into small circular sheets with an area of S; the second negative electrode film layer is wiped off from the small circular sheets; the small circular sheets and lithium sheets are assembled into a button cell, and capacity testing is performed on the button cell to obtain the capacity $C_{10}$ of the first negative electrode film layer on the small circular sheet. Then, the capacity per unit area of the first negative electrode film layer $C_1=C_{10}/S$. For example, the capacity per unit area of the second negative electrode film layer can be measured as follows: The negative electrode plate is punched into small circular sheets with an area of S; the first negative electrode film layer is wiped off from the small circular sheets; the small circular sheets and lithium sheets are assembled into a button cell, and capacity testing is performed on the button cell to obtain the capacity $C_{20}$ of the second negative electrode film layer on the small circular sheet. Then, the capacity per unit area of the second negative electrode film layer $C_2=C_{20}/S$.

The median particle size by volume $D_v50$ has a meaning known in the art, representing that 50% of the particle sizes of the silicon-based negative electrode active material particles in the volume-based particle size distribution is less than this value. $D_{v1}50$ and $D_{v2}50$ can be measured using methods known in the art. For example, the measurement can be performed using a laser particle size analyzer (such as Malvern Mastersizer 2000E made by Malvern Panalytical in the UK) with reference to GB/T 19077-2016 Particle Size Analysis-Laser Diffraction Methods, or the silicon-based negative electrode active material particles are scanned using a scanning electron microscope (SEM) to measure the median particle size by volume of the silicon-based negative electrode active material particles. When the test sample is taken from a prepared lithium-ion battery, the negative electrode active material can be sampled from the negative electrode plate of the lithium-ion battery, and sieved to obtain the silicon-based negative electrode active material particles to be tested; or the silicon-based negative electrode active material particles are marked in the SEM image of the negative electrode active material, and statistics are collected to obtain the median particle size by volume of the silicon-based negative electrode active material particles.

In this application, the grain size of crystal grains has a meaning known in the art and can be measured using methods known in the art. For example, the grain size of crystal grains can be obtained by the XRD pattern of the silicon-based negative electrode active material particles can be analyzed using X-ray diffraction (XRD) to obtain the diffraction half-peak width or integral width B of the silicon-based negative electrode active material particles, and then the grain size of crystal grains can be obtained according to the Scherrer formula $D=K\gamma/BCOS\theta$, where D represents the grain size of crystal grains, K is the Scherrer constant, $\theta$ is the Bragg angle, $\gamma$ is the wavelength of the X-ray, and $\gamma=1.54056A$. When the test sample is taken from a prepared lithium-ion battery, the negative electrode active material can be sampled from the negative electrode plate of the lithium-ion battery, and sieved to obtain the silicon-based negative electrode active material particles to be tested, and then the XRD pattern of the silicon-based negative electrode active material particles can be analyzed to determine the grain size of crystal grains; or the characteristic peaks of the silicon-based negative electrode active material particles can be identified from the XRD pattern of the negative electrode active material, and the characteristic peaks can be analyzed to determine the grain size of crystal grains.

In this application, the gram capacity has a meaning known in the art, and can represent a ratio of the actual electrical capacity released by the material under test to its mass. In an example, the gram capacity of the material under test can be determined according to the following steps: A mass m of the material under test is weighed; the material under test is mixed with the optional conductive agent and optional binder to prepare a negative electrode slurry; the negative electrode slurry is applied onto the surface of a copper foil, followed by drying and cold pressing, to prepare a negative electrode plate; and the negative electrode plate and the lithium plate are assembled into a button cell, and the button cell is charged at a rate of 0.1C and discharged at a rate of 0.1C to perform capacity test, so as to obtain the capacity $C_{30}$ of the negative electrode film layer of the negative electrode plate. Then the gram capacity of the material under test=$C_{30}$/m.

It should be noted that in this application, for various parameter tests for the negative electrode active material or the negative electrode film layer, samples can be taken during battery preparation or from prepared secondary batteries.

When the test samples are taken from prepared lithium-ion batteries, in an example, the samples can be taken according to the following steps (1) to (3).

(1) Discharge the lithium-ion battery (for safety reasons, the battery is generally fully discharged); disassemble the battery to take out the negative electrode plate, soak the negative electrode plate in dimethyl carbonate (DMC) for a certain period of time (for example, 2 to 10 hours); and take out the negative electrode plate and dry it for some time at a specified temperature (for example, 4 hours at 60° C.), and then take out the dried negative electrode plate. In this case, the samples can be taken from the dried negative electrode plate to test parameters related to the negative electrode film layer described in this application.

(2) Bake the dried negative electrode plate from step (1) for some time at a specified temperature (for example, 2 hours at 400° C.), select any region from the baked negative electrode plate to sample the negative electrode active material (powder can be scrapped from the material with a blade).

(3) Sieve the negative electrode active material collected in step (2) (for example, using a 200-mesh sieve), to finally obtain samples that can be used for testing the parameters of the negative electrode active material described in this application.

Electrode Assembly

A second aspect of this application provides an electrode assembly including the negative electrode plate according to the first aspect of this application.

The electrode assembly of this application includes the negative electrode plate according to the first aspect of this application, and when applied to a secondary battery, at least enables the secondary battery to have high energy density and good long-term cycling performance.

This application does not limit the type of the electrode assembly, and the electrode assembly may be an electrode assembly with a structure known in the art.

The electrode assembly may include a negative electrode plate and a positive electrode plate. In some embodiments, the electrode assembly may further include a separator. The separator is disposed between the positive electrode plate and the negative electrode plate to provide separation. This application has no specific limitation on a type of the separator, and any well-known porous separator with good chemical stability and mechanical stability can be selected. In some embodiments, a material of the separator may be selected from one or more of glass fiber, non-woven fabric, polyethylene, polypropylene, and polyvinylidene fluoride. The separator may be a single-layer thin film or a multi-layer composite thin film. When the separator is a multi-layer composite thin film, each layer is made of the same or different materials.

In the electrode assembly of this application, the positive electrode plate includes a positive electrode current collector and a positive electrode film layer disposed on at least one surface of the positive electrode current collector and including a positive electrode active material. For example, the positive electrode current collector has two opposite surfaces in its thickness direction, and the positive electrode film layer is disposed on either or both of the two opposite surfaces of the positive electrode current collector.

In the electrode assembly of this application, the positive electrode active material may be a positive electrode active material known in the art that can be used for secondary batteries. For example, the positive electrode active material may include one or more of lithium transition metal oxide, olivine-structured lithium-containing phosphate, and respective modified compounds thereof. Examples of the lithium transition metal oxide may include but are not limited to one or more of lithium cobalt oxide, lithium nickel oxide, lithium manganese oxide, lithium nickel cobalt oxide, lithium manganese cobalt oxide, lithium nickel manganese oxide, lithium nickel cobalt manganese oxide, lithium nickel cobalt aluminum oxide, and modified compounds thereof. Examples of the olivine-structured lithium-containing phosphate may include but are not limited to one or more of lithium iron phosphate, a composite material of lithium iron phosphate and carbon, lithium manganese phosphate, a composite material of lithium manganese phosphate and carbon, lithium manganese iron phosphate, a composite material of lithium manganese iron phosphate and carbon, and respective modified compounds thereof. This application is not limited to these materials, and other conventionally well-known materials that can be used as a positive electrode active material for secondary batteries may also be used.

In the electrode assembly of this application, the positive electrode film layer usually includes the positive electrode active material as well as an optional binder and an optional conductive agent, and is usually obtained by applying a positive electrode slurry, followed by drying and cold pressing. The positive electrode slurry is usually formed by dispersing the positive electrode active material, the optional conductive agent, the optional binder, and the like in a solvent and stirring them to uniformity. The solvent may be N-methylpyrrolidone (NMP).

In an example, the binder for the positive electrode film layer may include one or more of polyvinylidene fluoride (PVDF) and polytetrafluoroethylene (PTFE).

In an example, the conductive agent for the positive electrode film layer may include one or more of superconducting carbon, carbon black (for example, acetylene black or Ketjen black), carbon dots, carbon nanotubes, graphene, and carbon nanofiber.

In the electrode assembly of this application, the positive electrode current collector may use a metal foil or a composite current collector (the composite current collector may be formed by providing a metal material on a polymer matrix). For example, the positive electrode current collector may be an aluminum foil.

In some embodiments, the positive electrode plate, separator, and negative electrode plate can be made into an electrode assembly with a stacked structure through a lamination process.

Figure 2:
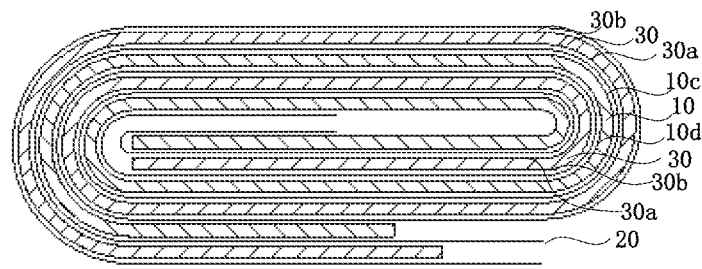
FIG. 2 is a schematic diagram of another embodiment of an electrode assembly according to this application.

FIG. 1 is a schematic diagram of an embodiment of an electrode assembly according to this application. The example electrode assembly includes a negative electrode plate 10, a separator 20, and a positive electrode plate 30, where the negative electrode plate 10 and the positive electrode plate 30 are arranged alternately. As shown in FIG. 2, the negative electrode plate 10 includes a first surface 10a and a second surface 10b in a thickness direction of the negative electrode plate 10, where the first surface 10a is a surface of the negative electrode plate 10 facing an outer side of the electrode assembly, and the second surface 10b is a surface of the negative electrode plate 10 facing away from the outer side of the electrode assembly. In some embodiments, a negative electrode film layer (not shown in the figure) is disposed on the first surface 10a of the negative electrode plate 10, and such negative electrode film layer is an embodiment of the first negative electrode film layer according to the embodiments of this application; and a negative electrode film layer (not shown in the figure) is also disposed on the second surface 10b of the negative electrode plate 10, and such negative electrode film layer is an embodiment of the second negative electrode film layer according to the embodiments of this application. In some embodiments, a negative electrode film layer (not shown in the figure) is disposed on the first surface 10a of the negative electrode plate 10, and such negative electrode film layer is an embodiment of the second negative electrode film layer according to the embodiments of this application; and a negative electrode film layer (not shown in the figure) is also disposed on the second surface 10b of the negative electrode plate 10, and such negative electrode film layer is an embodiment of the first negative electrode film layer according to the embodiments of this application.

In some embodiments, the negative electrode plate and the positive electrode plate, with the separator in between, are wound along a winding direction to form a wound structure. The first positive electrode film layer is disposed opposite the first negative electrode film layer with the separator in between, and the second positive electrode film layer is disposed opposite the second negative electrode film layer with the separator in between. The first positive electrode film layer is located on an outer side of the first negative electrode film layer, and the second positive electrode film layer is located on an inner side of the second negative electrode film layer.

FIG. 2 is a schematic diagram of an embodiment of an electrode assembly according to this application. The example electrode assembly includes a negative electrode plate 10, a separator 20, and a positive electrode plate 30, where the negative electrode plate 10 and the positive electrode plate 30, with the separator 20 in between, are wound along a winding direction to form a wound structure. As shown in FIG. 1, the negative electrode plate includes an outer surface 10c and an inner surface 10d. A negative electrode film layer (not shown in the figure) is disposed on the outer surface 10c of the negative electrode plate 10, and such negative electrode film layer is an embodiment of the first negative electrode film layer according to the embodiments of this application. A negative electrode film layer (not shown in the figure) is also disposed on the inner surface 10d of the negative electrode plate 10, and such negative electrode film layer is an embodiment of the second negative electrode film layer according to the embodiments of this application. Correspondingly, the positive electrode plate 30 includes an inner surface 30a disposed opposite the outer surface 10c of the negative electrode plate, and an outer surface 30b of the positive electrode plate disposed opposite the inner surface 10d of the negative electrode plate 10. A positive electrode film layer (not shown in the figure) is disposed on the inner surface 30a of the positive electrode plate 30, and such positive electrode film layer is an embodiment of the first positive electrode film layer according to the embodiments of this application. A positive electrode film layer (not shown in the figure) is also disposed on the outer surface 30b of the positive electrode plate 30, and such positive electrode film layer is an embodiment of the second positive electrode film layer according to the embodiments of this application.

In the negative electrode plate of the electrode assembly of this application, its first film layer has a larger capacity per unit area, and can still have a high capacity per unit area after winding. As a result, the negative electrode film layer located on the outer surface of the negative electrode plate can accommodate more active lithium ions, thereby reducing the risk of lithium precipitation on the surface of the negative electrode plate. Further, compared to the second negative electrode film layer, the silicon-based negative electrode material particles contained in the first negative electrode film layer have a larger median particle size by volume, thereby exhibiting higher capacity performance. This not only helps to improve the capacity per unit area of the negative electrode film layer located on the outer surface of the negative electrode plate and further improve the safety performance of the secondary battery, but also helps to improve the initial coulombic efficiency of the secondary battery. Correspondingly, the silicon-based negative electrode active material particles contained in the second negative electrode film layer have a smaller median particle size by volume, resulting in a low volume swelling rate and a short transport path for lithium ions. This helps to reduce the risk of pulverization and inactivation of the silicon-based negative electrode active material particles and electrochemical polarization, enabling the secondary battery to have good long-term cycling performance. Therefore, the electrode assembly of this application, when applied to a secondary battery, can significantly improve the energy density, safety performance, and long-term cycling performance of the secondary battery.

In some embodiments, the wound structure includes a bending region and a straight region connected to the bending region; and the negative electrode plate includes a plurality of bending portions in the bending region and a plurality of straight portions in the straight region, two ends of the straight portion respectively connected to the bending portions.

At least one bending portion in the negative electrode plate is a first bending portion, at least one straight portion in the negative electrode plate is a first straight portion connected to the first bending portion, and the first bending portion and the first straight portion satisfy: $C_3>C_4$, where $C_3$ represents an active material capacity per unit area of the first negative electrode film layer in the first bending portion; and $C_4$ represents an active material capacity per unit area of the first negative electrode film layer in the first straight portion.

Without being limited to any theory or explanation, the positive electrode film layer facing the bending portion of the negative electrode plate with the separator in between has a higher capacity than the positive electrode film layer facing the straight portion of the negative electrode plate with the separator in between, making the capacity of the negative electrode film layer in the bending portion greater than that in the straight portion, thereby reducing the risk of lithium precipitation in the bending portion.

In some embodiments, the electrode assembly may satisfy: $CB_1>CB_2>1$, where $CB_1$ represents a ratio of a capacity of the first negative electrode film layer to a capacity of the first positive electrode film layer; and $CB_2$ represents a ratio of an active material capacity of the second negative electrode film layer to a capacity of the second positive electrode film layer.

Without being limited to any theory or explanation, when $CB_1$ and $CB_2$ satisfy the above condition, the lithiation pressure of the first negative electrode film layer can be alleviated, reducing the risk of lithium precipitation, thereby helping to improve the safety performance of the secondary battery.

In some embodiments, the electrode assembly may satisfy: $0.7 \leq CB_2/CB_1 \leq 0.99$, optionally $0.75 \leq CB_2/CB_1 \leq 0.98$.

Without being limited to any theory or explanation, when $CB_2$ and $CB_1$ satisfy the above relationship, the risk of lithium precipitation on the surfaces of the first negative electrode film layer and the second negative electrode film layer can be reduced, thereby helping to improve the safety performance of the secondary battery.

Battery Cell

A third aspect of this application provides a battery cell including a housing and the electrode assembly according to the first aspect of this application.

Generally, the battery cell further includes an electrolyte, where the electrolyte conducts active ions between the positive electrode plate and the negative electrode plate. The electrolyte is not specifically limited to any particular type in this application, and may be selected depending on needs. For example, the electrolyte may be selected from at least one of a solid electrolyte and a liquid electrolyte (that is, an electrolyte solution).

In some embodiments, the electrolyte is a liquid electrolyte. The liquid electrolyte includes an electrolytic salt and a solvent.

The electrolytic salt is not limited to a specific type, and can be selected based on actual needs. For example, the electrolytic salt includes one or more selected from lithium salts for lithium-ion batteries and sodium salts for sodium-ion batteries. For example, the lithium salt may include one or more selected from lithium hexafluorophosphate (LiPF$_6$), lithium tetrafluoroborate (LiBF$_4$), lithium perchlorate (LiClO$_4$), lithium hexafluoroarsenate (LiAsF$_6$), lithium bis(fluorosulfonyl)imide (LiFSI), lithium bistrifluoromethanesulfonimide (LiTFSI), lithium trifluoromethanesulfonate (LiTFS), lithium difluoro (oxalato) borate (LiDFOB), lithium dioxalate borate (LiBOB), lithium difluorophosphate (LiPO$_2$F$_2$), lithium difluoro (dioxalato)phosphate (LiDFOP), and lithium tetrafluoro oxalato phosphate (LiTFOP).

The solvent is not limited to a specific type, and can be selected based on actual needs. In an example, the solvent may be selected from one or more of ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-gamma-butyrolactone (GBL), sulfolane (SF), methyl sulfone (MSM), ethyl methyl sulfone (EMS), and ethyl sulfone (ESE).

In some embodiments, the liquid electrolyte further optionally includes an additive. For example, the additive may include a negative electrode film-forming additive, or may include a positive electrode film-forming additive, or may include an additive capable of improving some performance of the battery, for example, an additive for improving overcharge resistance performance of the battery, an additive for improving high-temperature performance of the battery, or an additive for improving low-temperature power performance of the battery.

In some embodiments, the housing of the battery cell may be used for packaging the electrode assembly and electrolyte.

In some embodiments, the housing of the battery cell may be a hard shell, for example, a hard plastic shell, an aluminum shell, or a steel shell. The housing of the battery cell may alternatively be a soft pack, such as a soft pouch. A material of the soft pack may be plastic, for example, one or more of polypropylene (PP), polybutylene terephthalate (PBT), polybutylene succinate (PBS), and the like.

Figure 3:
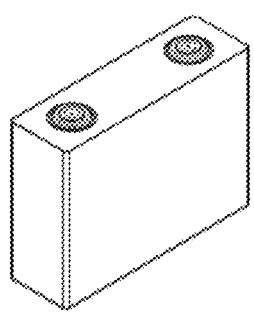
FIG. 3 is a schematic diagram of an embodiment of a battery cell according to this application.

This application does not specifically limit the shape of the battery cell, which can be flat, rectangular, or other shapes. FIG. 3 is a schematic diagram of a rectangular battery cell 5 as an example.

Figure 4:
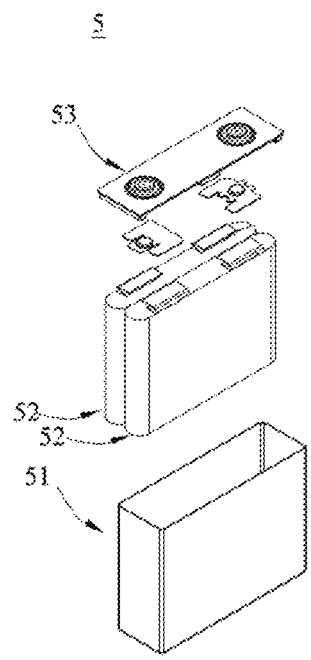
FIG. 4 is a schematic exploded view of the embodiment of the battery cell shown in FIG. 3.

FIG. 4 is a schematic exploded view of the battery cell shown in FIG. 3. In some embodiments, as shown in FIG. 3, the housing may include a shell 51 and a cover plate 53. The shell 51 may include a base plate and side plates connected to the base plate, and the base plate and the side plates enclose an accommodating cavity. The shell 51 has an opening communicating with the accommodating cavity, and the cover plate 53 is configured to cover the opening to close the accommodating cavity. The electrode assembly 52 according to the first aspect of the embodiments of this application is packaged in the accommodating cavity. The liquid electrolyte infiltrates the electrode assembly 52. There may be one or more electrode assemblies 52 in the battery cell 5, and the quantity may be adjusted as required.

The preparation method of the battery cell of this application is well-known. In some embodiments, the electrode assembly can be placed in an outer package, dried, injected with electrolyte, and subjected to processes such as vacuum sealing, standing, formation, and shaping to obtain the battery cell.

Battery

A fourth aspect of this application provides a battery including the battery cell according to the third aspect of this application.

The battery mentioned in this application is a single physical module that includes one or more battery cells for providing a higher voltage and capacity. For example, the battery mentioned in this application may be a battery module, a battery pack, or the like. The battery typically includes a box for packaging one or more battery cells. The box can prevent liquids or other foreign matter from affecting charging or discharging of the battery cell.

In some embodiments, there may be a plurality of battery cells in the battery, and the plurality of battery cells may be connected in series or in parallel or in series-parallel, where series-parallel means a combination of series and parallel connections of the plurality of battery cells. The plurality of battery cells may be directly connected in series, parallel, or series-parallel, and then an entirety of the plurality of battery cells is accommodated in the box; or certainly, the battery may be formed by a plurality of battery cells being connected in series, parallel, or series-parallel first to form a battery module and then a plurality of battery modules being connected in series, parallel, or series-parallel to form an entirety which is accommodated in the box.

Figure 5:
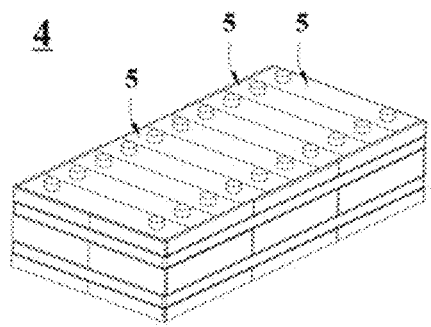
FIG. 5 is a schematic diagram of an embodiment of a battery module according to this application.

FIG. 5 is a schematic diagram of a battery module 4 as an example. As shown in FIG. 5, there are a plurality of battery cells 5, and the plurality of battery cells 5 are first connected in series, parallel, or series-parallel to form a battery module 4. The plurality of battery cells 5 in the battery module 4 can be electrically connected through busbar components to achieve series, parallel, or series-parallel connections among the plurality of battery cells 5 in the battery module 4. In the battery module 4, the plurality of battery cells 5 can be sequentially arranged along the length direction of the battery module 4. Certainly, the battery cells may alternatively be arranged in any other manners. Further, the plurality of battery cells 5 may be fastened through fasteners.

In some embodiments, the battery module may be further assembled into a battery pack, and a quantity of battery modules included in the battery pack may be adjusted based on use and capacity of the battery pack.

Figure 6:
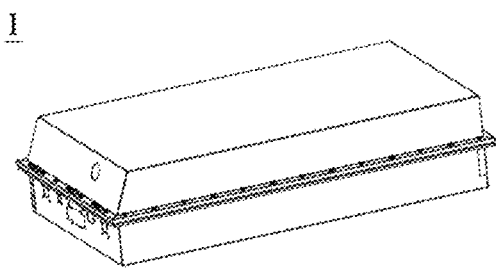
FIG. 6 is a schematic diagram of an embodiment of a battery pack according to this application.
Figure 7:
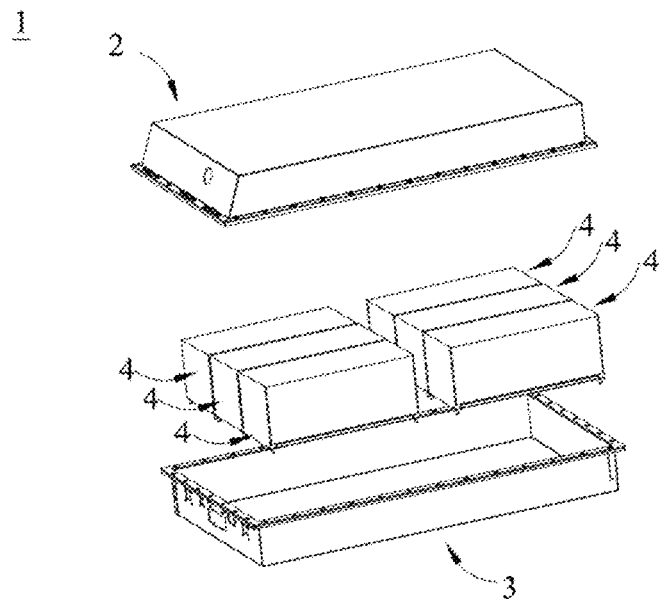
FIG. 7 is an exploded view of the embodiment of the battery pack shown in FIG. 6 according to this application.

FIG. 6 and FIG. 7 are schematic diagrams of a battery pack 1 as an example. As shown in FIG. 6 and FIG. 7, the battery pack 1 can include a box and a plurality of battery modules 4 arranged in the box. The plurality of battery modules 4 in the battery pack 1 can be electrically connected through busbar components to achieve series, parallel, or series-parallel connections among the plurality of battery modules 4 in the battery pack 1. The box includes an upper box body 2 and a lower box body 3. The upper box body 2 is configured to cover the lower box body 3 to form an enclosed space for accommodating the battery modules 4. The plurality of battery modules 4 may be arranged in the battery box in any manner.

Electric Apparatus

This application further provides an electric apparatus, where the electric apparatus includes the battery cell of this application. The battery cell may be used as a power source of the electric apparatus or an energy storage unit of the electric apparatus. The electric apparatus may include but is not limited to a mobile device (for example, a mobile phone or a notebook computer), an electric vehicle (for example, a battery electric vehicle, a hybrid electric vehicle, a plug-in hybrid electric vehicle, an electric bicycle, an electric scooter, an electric golf vehicle, or an electric truck), an electric train, a ship, a satellite system, or an energy storage system.

Figure 8:
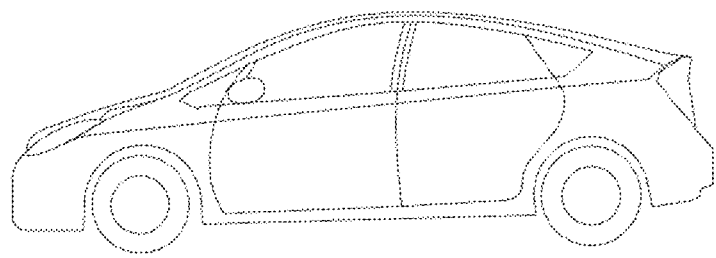
FIG. 8 is a schematic diagram of an electric apparatus using the secondary battery according to an embodiment of this application as a power source.

FIG. 8 shows an electric apparatus as an example. The electric apparatus is a battery electric vehicle, a hybrid electric vehicle, a plug-in hybrid electric vehicle, or the like. To meet the demand for high power and high energy density of the apparatus, a battery pack or battery module including the battery cell of this application can be used.

In another example, the electric apparatus may be a mobile phone, a tablet computer, a notebook computer, or the like. Such electric apparatus is generally required to be light and thin and may use a battery cell as its power source.

EXAMPLES

Examples below more specifically describe the content disclosed in this application, and these embodiments are merely used for explanatory description. It is apparent for a person skilled in the art to make various modifications and variations within the scope of the content disclosed in this application. Unless otherwise stated, all parts, percentages, and ratios reported in the following examples are based on weight, all reagents used in the examples are commercially available or synthesized in a conventional manner, and can be used directly without further treatment. All instruments used in the examples are commercially available.

Example 1

Preparation of Positive Electrode Plate

The positive electrode active material $LiNi_{0.8}Co_{0.1}Mn_{0.1}O_2$, conductive carbon black, and binder polyvinylidene fluoride (PVDF) were mixed at a weight ratio of 98:1:1 in an appropriate amount of N-methylpyrrolidone (NMP) solvent and well stirred to produce a uniform positive electrode slurry. The positive electrode slurry was applied onto the surface of a positive electrode current collector (13 μm-thick aluminum foil), followed by processes such as drying, cold pressing, and slitting, to obtain the positive electrode plate.

Preparation of Negative Electrode Plate

The first negative electrode active material (a mixture of first silicon oxide particles and graphite at a mass ratio of 15:85), conductive carbon black, thickener sodium carboxymethyl cellulose (CMC-Na), and binder styrene-butadiene rubber emulsion (SBR) were mixed at a weight ratio of 96:0.8:1.2:2 in an appropriate amount of deionized water and well stirred to produce a uniform first negative electrode slurry. The first negative electrode slurry was applied onto one surface of a copper foil, with a coating weight of 0.13 g/1540.25 mm². Processes such as drying were performed to form a first negative electrode film layer on the surface of the copper foil.

The second negative electrode active material (a mixture of second silicon oxide particles and graphite at a mass ratio of 15:85), conductive carbon black, thickener sodium carboxymethyl cellulose (CMC-Na), and binder styrene-butadiene rubber emulsion (SBR) were mixed at a weight ratio of 96:0.8:1.2:2 in an appropriate amount of deionized water and well stirred to produce a uniform second negative electrode slurry. The second negative electrode slurry was applied onto the other surface of the copper foil, with a coating weight of 0.13 g/1540.25 mm². Processes such as drying were performed to form a second negative electrode film layer on the surface of the copper foil. Then cold pressing was performed to obtain the negative electrode plate including a negative electrode film layer with a compacted density of 1.6 g/cm³.

Preparation of Electrolyte

In a dry argon atmosphere glove box ($H_2O<0.1$ ppm, $O_2<0.1$ ppm), organic solvents propylene carbonate (PC), ethylene carbonate (EC), and diethyl carbonate (DEC) were mixed at a weight ratio of 1:1:1, and then a fully dried lithium salt $LiPF_6$ was dissolved in the organic solvents, followed by mixing to uniformity, to obtain an electrolyte with a lithium salt concentration of 1 mol/L.

Separator

The polyethylene separator was used.

Preparation of Secondary Battery

The positive electrode plate, separator, and negative electrode plate were stacked in sequence, and the resulting stack was wound to obtain an electrode assembly. In this electrode assembly, the first negative electrode film layer was located on the outer surface of the negative electrode plate, and the second negative electrode film layer was located on the inner surface of the negative electrode plate. The electrode assembly was placed into an outer package, the prepared electrolyte was injected, and processes such as sealing, standing, formation, and aging were performed to obtain the secondary battery.

Examples 2 to 27

Based on the preparation process of Example 1, the preparation parameters were adjusted according to Table 1 to prepare the positive electrode plates, negative electrode plates, electrolytes, separators, and secondary batteries of Examples 2 to 27.

$C_2/C_1$ can be controlled by adjusting the coating weight of the first negative electrode film layer and/or the second negative electrode film layer. $CB_1/CB_2$ can be controlled by adjusting $C_2/C_1$, capacity of the first positive electrode film layer, and capacity of the second positive electrode film layer. The gram capacity of the first silicon oxide particles is 1250 mAh/g-1300 mAh/g, and the gram capacity of the second silicon oxide particles is 1150 mAh/g-1200 mAh/g.

Comparative Examples 1 to 5

Based on the preparation process of Example 1, the preparation parameters were adjusted according to Table 1 to prepare the positive electrode plates, negative electrode plates, electrolytes, separators, and secondary batteries of Comparative examples 1 to 5.

$C_2/C_1$ can be controlled by adjusting the coating weight of the first negative electrode film layer and/or the second negative electrode film layer. $CB_1/CB_2$ can be controlled by adjusting $C_2/C_1$, capacity of the first positive electrode film layer, and capacity of the second positive electrode film layer.

In the above examples and comparative examples, different first silicon oxide particles and second silicon oxide particles can be selected from silicon oxide particles with different particle sizes prepared at different temperatures. Specifically, XRD tests and median particle size tests can be conducted on the silicon oxide particles to select the first silicon-based negative electrode active material particles with $d_1/DV_150$ within a specified range and the second silicon-based negative electrode active material particles with $d_2/D_{v2}50$ within a specified range.

The following tests were performed on the secondary batteries of Examples 1 to 27 and Comparative examples 1 to 5. The test results obtained are shown in Table 2.

Charging Capability Test

At 25° C., the secondary battery was fully charged at nC (for example, n=0.1, 0.2, 0.3, 0.4, or 0.5) and fully discharged at 1C. Such cycle was repeated 10 times. Then the secondary battery was fully charged at 1C and disassembled to take out the negative electrode plate and observe the lithium precipitation on the surface of the negative electrode plate. If no lithium precipitation is observed, the battery was charged at (n+0.1) C, and test was performed again. The charge rate was increased by 0.1C each time until lithium precipitation was observed on the surface of the negative electrode. The charge rate at that point minus 0.1C is the charging capability of the secondary battery.

Energy Density Test

At 25° C., the secondary battery was fully charged at 0.33C and fully discharged at 0.33C for 3 cycles. The discharge energy (E) at the last cycle was recorded, the mass (m) of the secondary battery was weighed using an electronic balance, and W=E/m. The energy density of the secondary battery in Example 2 was set as 100%, and the energy densities of other secondary batteries were determined accordingly.

Storage Life Test

The secondary battery was fully charged to 97% state of charge (97% SOC), and stored at 60° C. until the capacity decayed to 80% SOC. The storage time at that point was recorded as the storage life of the secondary battery.

Cycle Life Test

At 25° C., the secondary battery was charged at a rate of 3C and discharged at a rate of 1C for 3%-97% SOC cycle testing until the capacity of the secondary battery is less than 80% of the initial capacity. The number of cycles at that point was recorded as the cycle life of the secondary battery.

TABLE 1

| No. | $C_1$ mAh/(g·mm²) | $C_2$ mAh/(g·mm²) | $C_2/C_1$ | $D_{v1}50$ (μm) | $d_1$ (nm) | $d_1/D_{v1}50$ | $D_{v2}50$ (μm) | $d_2$ (nm) | $d_2/D_{v2}50$ | $D_{v2}50/D_{v1}50$ | $CB_1$ | $CB_2$ | $CB_2/CB_1$ |
|---|---|---|---|---|---|---|---|---|---|---|---|---|---|
| Example 1 | 0.0120 | 0.0060 | 0.5 | 6 | 10 | 0.0017 | 3 | 4 | 0.0013 | 0.5000 | 1.10 | 1.07 | 0.97 |
| Example 2 | 0.0100 | 0.0070 | 0.7 | 6 | 10 | 0.0017 | 3 | 4 | 0.0013 | 0.5000 | 1.10 | 1.07 | 0.97 |
| Example 3 | 0.0107 | 0.0080 | 0.75 | 6 | 10 | 0.0017 | 3 | 4 | 0.0013 | 0.5000 | 1.10 | 1.07 | 0.97 |
| Example 4 | 0.0113 | 0.0090 | 0.8 | 6 | 10 | 0.0017 | 3 | 4 | 0.0013 | 0.5000 | 1.10 | 1.07 | 0.97 |
| Example 5 | 0.0118 | 0.0100 | 0.85 | 6 | 10 | 0.0017 | 3 | 4 | 0.0013 | 0.5000 | 1.10 | 1.07 | 0.97 |
| Example 6 | 0.0133 | 0.0120 | 0.9 | 6 | 10 | 0.0017 | 3 | 4 | 0.0013 | 0.5000 | 1.10 | 1.07 | 0.97 |
| Example 7 | 0.0113 | 0.0090 | 0.8 | 6 | 5 | 0.0008 | 3 | 4 | 0.0013 | 0.5000 | 1.10 | 1.07 | 0.97 |
| Example 8 | 0.0113 | 0.0090 | 0.8 | 6 | 7 | 0.0012 | 3 | 4 | 0.0013 | 0.5000 | 1.10 | 1.07 | 0.97 |
| Example 9 | 0.0113 | 0.0090 | 0.8 | 6 | 12 | 0.0020 | 3 | 4 | 0.0013 | 0.5000 | 1.10 | 1.07 | 0.97 |
| Example 10 | 0.0113 | 0.0090 | 0.8 | 6 | 24.3 | 0.0041 | 3 | 4 | 0.0013 | 0.5000 | 1.10 | 1.07 | 0.97 |

TABLE 1-continued

| No. | $C_1$ mAh/ (g·mm²) | $C_2$ mAh/ (g·mm²) | $C_2/C_1$ | $D_{v1}50$ (μm) | $d_1$ (nm) | $d_1/D_{v1}50$ | $D_{v2}50$ (μm) | $d_2$ (nm) | $d_2/D_{v2}50$ | $D_{v2}50/D_{v1}50$ | $CB_1$ | $CB_2$ | $CB_2/CB_1$ |
|---|---|---|---|---|---|---|---|---|---|---|---|---|---|
| Example 11 | 0.0113 | 0.0090 | 0.8 | 6.5 | 10 | 0.0015 | 3 | 4 | 0.0013 | 0.4615 | 1.10 | 1.07 | 0.97 |
| Example 12 | 0.0113 | 0.0090 | 0.8 | 9 | 10 | 0.0011 | 3 | 4 | 0.0013 | 0.3333 | 1.10 | 1.07 | 0.97 |
| Example 13 | 0.0113 | 0.0090 | 0.8 | 10 | 10 | 0.0010 | 3 | 4 | 0.0013 | 0.3000 | 1.10 | 1.07 | 0.97 |
| Example 14 | 0.0113 | 0.0090 | 0.8 | 11.3 | 3.4 | 0.0003 | 3 | 4 | 0.0013 | 0.2655 | 1.10 | 1.07 | 0.97 |
| Example 15 | 0.0113 | 0.0090 | 0.8 | 6 | 10 | 0.0017 | 3 | 3 | 0.0010 | 0.5000 | 1.10 | 1.07 | 0.97 |
| Example 16 | 0.0113 | 0.0090 | 0.8 | 6 | 10 | 0.0017 | 3 | 3.5 | 0.0012 | 0.5000 | 1.10 | 1.07 | 0.97 |
| Example 17 | 0.0113 | 0.0090 | 0.8 | 6 | 10 | 0.0017 | 3 | 5 | 0.0017 | 0.5000 | 1.10 | 1.07 | 0.97 |
| Example 18 | 0.0113 | 0.0090 | 0.8 | 6 | 10 | 0.0017 | 3 | 6 | 0.0020 | 0.5000 | 1.10 | 1.07 | 0.97 |
| Example 19 | 0.0113 | 0.0090 | 0.8 | 6 | 10 | 0.0017 | 2.5 | 4 | 0.0016 | 0.4167 | 1.10 | 1.07 | 0.97 |
| Example 20 | 0.0113 | 0.0090 | 0.8 | 6 | 10 | 0.0017 | 5 | 4 | 0.0008 | 0.8333 | 1.10 | 1.07 | 0.97 |
| Example 21 | 0.0113 | 0.0090 | 0.8 | 6 | 10 | 0.0017 | 5.5 | 4 | 0.0007 | 0.9167 | 1.10 | 1.07 | 0.97 |
| Example 22 | 0.0113 | 0.0090 | 0.8 | 6 | 10 | 0.0017 | 5.9 | 1.3 | 0.0002 | 0.9833 | 1.10 | 1.07 | 0.97 |
| Example 23 | 0.0113 | 0.0090 | 0.8 | 10 | 10 | 0.0010 | 2 | 4 | 0.0020 | 0.2000 | 1.10 | 1.07 | 0.97 |
| Example 24 | 0.0113 | 0.0090 | 0.8 | 6 | 10 | 0.0017 | 3 | 4 | 0.0013 | 0.5000 | 1.53 | 1.07 | 0.7 |
| Example 25 | 0.0113 | 0.0090 | 0.8 | 6 | 10 | 0.0017 | 3 | 4 | 0.0013 | 0.5000 | 1.43 | 1.07 | 0.75 |
| Example 26 | 0.0113 | 0.0090 | 0.8 | 6 | 10 | 0.0017 | 3 | 4 | 0.0013 | 0.5000 | 1.09 | 1.07 | 0.98 |
| Example 27 | 0.0113 | 0.0090 | 0.8 | 6 | 10 | 0.0017 | 3 | 4 | 0.0013 | 0.5000 | 1.08 | 1.07 | 0.99 |
| Comparative example 1 | 0.1000 | 0.1000 | 1.0 | 6 | 10 | 0.0017 | 3 | 4 | 0.0013 | 0.5000 | 1.10 | 1.07 | 0.97 |
| Comparative example 2 | 0.0113 | 0.0090 | 0.8 | 12 | 2.4 | 0.0002 | 3 | 4 | 0.0013 | 0.5000 | 1.10 | 1.07 | 0.97 |
| Comparative example 3 | 0.0113 | 0.0090 | 0.8 | 6 | 30 | 0.0050 | 3 | 4 | 0.0013 | 0.5000 | 1.10 | 1.07 | 0.97 |
| Comparative example 4 | 0.0113 | 0.0090 | 0.8 | 6 | 10 | 0.0017 | 13 | 1.3 | 0.0001 | 0.5000 | 1.10 | 1.07 | 0.97 |
| Comparative example 5 | 0.0113 | 0.0090 | 0.8 | 6 | 10 | 0.0017 | 3 | 9 | 0.0030 | 0.5000 | 1.10 | 1.07 | 0.97 |

TABLE 2-1

| No. | Charging capability | Storage life (days) | Cycles | Energy density |
|---|---|---|---|---|
| Example 1 | 5.60 C | 400 | 1700 | 95% |
| Example 2 | 5.58 C | 390 | 1680 | 100% |
| Example 3 | 5.55 C | 385 | 1650 | 102% |
| Example 4 | 5.50 C | 380 | 1600 | 105% |
| Example 5 | 5.46 C | 360 | 1500 | 109% |
| Example 6 | 5.43 C | 350 | 1450 | 111% |
| Comparative example 1 | 4.90 C | 340 | 1200 | 115% |

TABLE 2-2

| No. | Charging capability | Storage life (days) | Cycles | Energy density |
|---|---|---|---|---|
| Example 4 | 5.50 C | 380 | 1600 | 105% |
| Example 7 | 5.53 C | 390 | 1700 | 100% |
| Example 8 | 5.51 C | 385 | 1650 | 103% |
| Example 9 | 5.49 C | 375 | 1500 | 110% |
| Example 10 | 5.00 C | 330 | 1200 | 115% |
| Example 11 | 5.40 C | 370 | 1500 | 104% |
| Example 12 | 5.30 C | 360 | 1300 | 104% |
| Example 13 | 5.20 C | 354 | 1200 | 103% |
| Example 14 | 5.05 C | 320 | 1100 | 105% |
| Example 23 | 5.40 C | 360 | 1400 | 103% |
| Comparative Example 2 | 4.90 C | 400 | 1050 | 98% |
| Comparative example 3 | 4.90 C | 290 | 900 | 107% |

TABLE 2-3

| No. | Charging capability | Storage life (days) | Cycles | Energy density |
|---|---|---|---|---|
| Example 4 | 5.50 C | 380 | 1600 | 105% |
| Example 15 | 5.58 C | 390 | 1650 | 101% |
| Example 16 | 5.54 C | 385 | 1620 | 103% |
| Example 17 | 5.40 C | 380 | 1580 | 106% |
| Example 18 | 5.20 C | 310 | 1400 | 108% |
| Example 19 | 5.60 C | 385 | 1650 | 101% |
| Example 20 | 5.40 C | 370 | 1550 | 106% |
| Example 21 | 5.35 C | 375 | 1500 | 108% |
| Example 22 | 5.20 C | 300 | 1400 | 105% |
| Example 23 | 5.40 C | 360 | 1400 | 103% |
| Comparative example 4 | 4.80 C | 395 | 1000 | 95% |
| Comparative example 5 | 5.10 C | 290 | 1350 | 108% |

TABLE 2-4

| No. | Charging capability | Storage life (days) | Cycles | Energy density |
|---|---|---|---|---|
| Example 4 | 5.50 C | 380 | 1600 | 105% |
| Example 24 | 5.45 C | 385 | 1650 | 101% |
| Example 25 | 5.43 C | 385 | 1630 | 103% |
| Example 26 | 5.51 C | 378 | 1580 | 106% |
| Example 27 | 5.52 C | 375 | 1570 | 107% |

According to the test results in Table 1 and Tables 2-1 to 2-4, for the negative electrode plate of the electrode assembly, when $d_1/D_{v1}50$, $d_2/D_{v2}50$, $C_1$, and $C_2$ are within the ranges specified in this application, the secondary battery can have high energy density, good long-term storage performance, and long-term cycling performance.

By contrast, in Comparative example 1, $C_1$ and $C_2$ do not satisfy $C_2<C_1$, and its corresponding secondary battery has significantly lower charging capability than Examples 1 to 6. In Comparative example 2, $d_1/D_{v1}50$ is lower than the range defined in this application, and its corresponding secondary battery has unsatisfactory charging capability, long-term cycling performance, and energy density. In Comparative example 3, $d_1/D_{v1}50$ is higher than the range defined in this application, and its corresponding secondary battery has significantly reduced charging capability, storage life, and cycle life. In Comparative example 4, the grain size of crystal grains of the second silicon oxide particles is small, which reduces the risk of oxidation of the second silicon oxide particles and improves the storage performance of the secondary battery. However, in Comparative example 4, $d_2/D_{v2}50$ is lower than the range defined in this application, resulting in decreased charging capability, long-term cycling performance, and energy density of the secondary battery. In Comparative example 5, $d_2/D_{v2}50$ is higher than the range defined in this application, and its corresponding secondary battery has reduced charging capability, storage life, and cycle life compared to Examples 4 and 15 to 23. The foregoing descriptions are merely specific embodiments of this application, but are not intended to limit the protection scope of this application. Any equivalent modifications or replacements readily figured out by a person skilled in the art within the technical scope disclosed in this application shall fall within the protection scope of this application. Therefore, the protection scope of this application shall be subject to the protection scope of the claims.

The invention claimed is:

1. A negative electrode plate, comprising:
   a negative electrode current collector, having a first surface and a second surface opposite each other in a thickness direction of the negative electrode current collector;
   a first negative electrode film layer located on the first surface side, wherein the first negative electrode film layer comprises first silicon-based negative electrode active material particles, and a grain size d1 of a crystal grain contained in the first silicon-based negative electrode active material particle and a median particle size by volume Dv150 of the first silicon-based negative electrode active material particles satisfy: 0.0003≤d1/Dv150≤0.004; and
   a second negative electrode film layer located on the second surface side, wherein the second negative electrode film layer comprises second silicon-based negative electrode active material particles, and a grain size d2 of a crystal grain contained in the second silicon-based negative electrode active material particles and a median particle size by volume Dv250 of the second silicon-based negative electrode active material particles satisfy:
   0.0002≤d2/Dv250≤0.002;
   wherein
   a capacity C1 per unit area of the first negative electrode film layer and a capacity C2 per unit area of the second negative electrode film layer satisfy: 0.005 mAh/(g·mm²)≤C2<C1≤0.2 mAh/(g·mm²).

2. The negative electrode plate according to claim 1, wherein the negative electrode plate satisfies at least one of the following:
   (1) Dv150 is 6 μm-10 μm;
   (2) 5 nm≤d1≤12 nm;
   (3) Dv250 is 2.5 μm-5.5 μm; and
   (4) 3 nm≤d2≤5 nm.

3. The negative electrode plate according to claim 1, wherein 0.2≤Dv250/Dv150≤0.9.

4. The negative electrode plate according to claim 1, wherein 0.7≤C2/C1≤0.9.

5. The negative electrode plate according to claim 1, wherein the first silicon-based negative electrode active material particles and the second silicon-based negative electrode active material particles are selected from a same type of silicon-based negative electrode active material particles, a gram capacity of the first silicon-based negative electrode active material being greater than a gram capacity of the second silicon-based negative electrode active material.

6. The negative electrode plate according to claim 1, wherein the first negative electrode film layer further comprises a third negative electrode active material, wherein the third negative electrode active material is selected from artificial graphite, natural graphite, hard carbon, soft carbon, or a combination thereof; and/or
   the second negative electrode film layer further comprises a fourth negative electrode active material, wherein the fourth negative electrode active material is selected from artificial graphite, natural graphite, hard carbon, soft carbon, or a combination thereof.

7. The negative electrode plate according to claim 6, wherein based on a total mass of the first silicon-based negative electrode active material particles and the third negative electrode active material, a mass percentage of the first silicon-based negative electrode active material particles is 10%-30%; and/or
   based on a total mass of the second silicon-based negative electrode active material particles and the fourth negative electrode active material, a mass percentage of the second silicon-based negative electrode active material particles is 10%-30%.

8. An electrode assembly, comprising the negative electrode plate according to claim 1.

9. The electrode assembly according to claim 8, wherein a positive electrode plate of the electrode assembly comprises: a positive electrode current collector, and a first positive electrode film layer and a second positive electrode film layer respectively located on two sides of the positive electrode current collector, wherein
   the negative electrode plate and the positive electrode plate, with a separator in between, are wound along a winding direction to form a wound structure, the first positive electrode film layer is disposed opposite the first negative electrode film layer with the separator in between, and the second positive electrode film layer is disposed opposite the second negative electrode film layer with the separator in between;
   wherein the first positive electrode film layer is located on an outer side of the first negative electrode film layer, and the second positive electrode film layer is located on an inner side of the second negative electrode film layer.

10. The electrode assembly according to claim 9, wherein the wound structure comprises a bending region and a straight region connected to the bending region;
    the negative electrode plate comprises a plurality of bending portions located in the bending region and a plurality of straight portions located in the straight region, two ends of the straight portion being connected to the bending portions respectively;
    wherein at least one bending portion in the negative electrode plate is a first bending portion, at least one straight portion in the negative electrode plate is a first straight portion connected to the first bending portion, and the first bending portion and the first straight portion satisfy: C3>C4, wherein C3 represents an active material capacity per unit area of the first negative electrode film layer in the first bending portion; and C4 represents an active material capacity per unit area of the first negative electrode film layer in the first straight portion.

11. The electrode assembly according to claim 9, satisfying CB1>CB2>1, wherein CB1 represents a ratio of a capacity of the first negative electrode film layer to a capacity of the first positive electrode film layer; and CB2 represents a ratio of a capacity of the second negative electrode film layer to a capacity of the second positive electrode film layer.

12. The electrode assembly according to claim 11, wherein 0.7≤CB2/CB1≤0.99.

13. A battery cell, comprising a housing and an electrode assembly, wherein the electrode assembly is accommodated in the housing, and the electrode assembly is selected from the electrode assembly according to claim 8.

14. A battery, comprising a plurality of the battery cells according to claim 13.

15. An electric apparatus, comprising the battery cell according to claim 13, wherein the battery cell is configured to supply electrical energy.

\* \* \* \* \*

UNITED STATES PATENT AND TRADEMARK OFFICE
CERTIFICATE OF CORRECTION

PATENT NO. : 12,438,149 B2  
APPLICATION NO. : 19/034792  
DATED : October 7, 2025  
INVENTOR(S) : Xingyan You et al.

Page 1 of 1

It is certified that error appears in the above-identified patent and that said Letters Patent is hereby corrected as shown below:

On the Title Page

Item (54), and in the Specification Column 1, Lines 1-3 should read:  
NEGATIVE ELECTRODE PLATE AND ELECTRODE ASSEMBLY, BATTERY CELL, BATTERY, AND ELECTRIC APPARATUS CONTAINING SAME Signed and Sealed this  
Twenty-fifth Day of November, 2025

John A. Squires  
*Director of the United States Patent and Trademark Office*